United States Patent
Ding et al.

(10) Patent No.: US 10,860,764 B1
(45) Date of Patent: Dec. 8, 2020

(54) LAYER ASSIGNMENT TECHNIQUE TO IMPROVE TIMING IN INTEGRATED CIRCUIT DESIGN

(71) Applicant: Cadence Design Systems, Inc., San Jose, CA (US)

(72) Inventors: Yi-Xiao Ding, Austin, TX (US); Jhih-Rong Gao, Austin, TX (US); Zhuo Li, Austin, TX (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 16/731,912

(22) Filed: Dec. 31, 2019

(51) Int. Cl.
| | | |
|---|---|---|
| *G06F 30/3312* | (2020.01) | |
| *G06F 30/337* | (2020.01) | |
| *G06F 30/392* | (2020.01) | |
| *G06F 30/3947* | (2020.01) | |
| *G06F 30/398* | (2020.01) | |
| *G06F 119/12* | (2020.01) | |
| *G06F 111/04* | (2020.01) | |
| *G06F 117/10* | (2020.01) | |

(52) U.S. Cl.
CPC ........ G06F 30/3312 (2020.01); G06F 30/337 (2020.01); G06F 30/392 (2020.01); G06F 30/398 (2020.01); G06F 30/3947 (2020.01); *G06F 2111/04* (2020.01); *G06F 2117/10* (2020.01); *G06F 2119/12* (2020.01)

(58) Field of Classification Search
CPC .. G06F 30/327; G06F 30/337; G06F 30/3312; G06F 30/39; G06F 30/392; G06F 30/394; G06F 30/398; G06F 30/3947; G06F 2117/10; G06G 2119/12
USPC ........................................................ 716/114
See application file for complete search history.

(56) References Cited

U.S. PATENT DOCUMENTS

| | | | | |
|---|---|---|---|---|
| 2004/0025134 | A1* | 2/2004 | Jung ..................... | G06F 30/394 716/114 |
| 2009/0259980 | A1* | 10/2009 | Alpert ................... | G06F 30/327 716/119 |
| 2011/0161904 | A1* | 6/2011 | Kondou .................. | G06F 30/39 716/114 |

* cited by examiner

*Primary Examiner* — Paul Dinh
(74) *Attorney, Agent, or Firm* — Schwegman Lundberg & Woessner, P.A.

(57) ABSTRACT

Aspects of the present disclosure address improved systems and methods for layer assignment to improve timing in integrated circuit (IC) designs. An initial placement layout of a net of an IC design is accessed. A plurality of buffer insertion candidates is generated using multiple candidate buffer insertion points and multiple layer assignments from among multiple layers of the IC design. Timing characteristics of each buffer insertion candidate are determined, and timing improvements provided by each buffer insertion candidate are determined based on respective timing characteristics. A buffer insertion candidate is selected from the plurality of buffer insertion candidates based on the timing improvement provided by the buffer insertion candidate. A layout instance for the IC is generated based in part on the selected buffer insertion candidate.

20 Claims, 4 Drawing Sheets

LAYER ASSIGNMENT TECHNIQUE TO IMPROVE TIMING IN INTEGRATED CIRCUIT DESIGN

TECHNICAL FIELD

The present disclosure generally relates to the technical field of integrated circuit design. In particular, the present disclosure addresses systems and methods for layer assignment to improve timing in integrated circuit designs.

BACKGROUND

An integrated circuit (IC) comprises cells of similar and/or various sizes, and connections between or among the cells. A cell includes several pins interconnected by wires to pins of one or more other cells. A net includes a set of pins connected by wires in order to form connections between or among the pins. An IC design may include multiple nets. A design netlist specifies connections between the pins.

Design engineers design IC's by transforming circuit descriptions of the IC's into geometric descriptions, called layouts. To create layouts, design engineers typically use electronic design automation (EDA) applications. These applications provide sets of computer-based tools for creating, editing, and analyzing IC design layouts.

EDA applications create layouts by using geometric shapes that represent different materials and devices on IC's. For instance, EDA tools commonly use rectilinear lines to represent the wire segments that interconnect the IC components. These tools also represent electronic and circuit IC components as geometric objects with varying shapes and sizes.

The IC design process entails various operations. Some of the physical-design operations that EDA applications commonly perform to obtain the IC layouts are: (1) circuit partitioning, which partitions a circuit if the circuit is too large for a single chip; (2) floor planning, which finds the alignment and relative orientation of the circuit modules; (3) placement, which determines more precisely the positions of the circuit components; (4) routing, which completes the interconnects between or among the circuit components; and (5) verification, which checks the layout to ensure that it meets design and functional requirements.

BRIEF DESCRIPTION OF THE DRAWINGS

Various ones of the appended drawings merely illustrate example embodiments of the present inventive subject matter and cannot be considered as limiting its scope.

DETAILED DESCRIPTION

Figure 1:
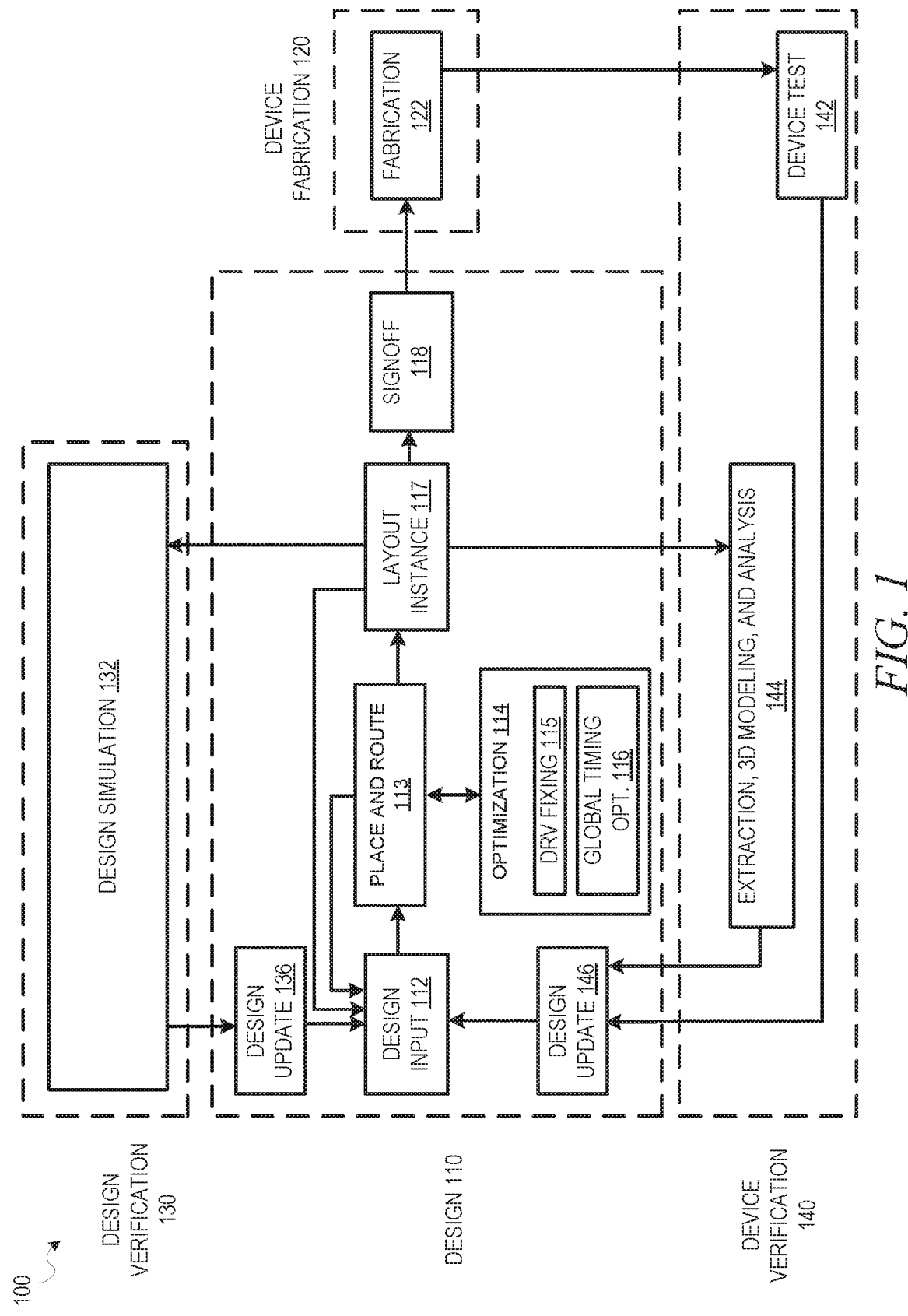
FIG. 1 is a diagram illustrating an example design process flow that includes a minimum-area layer assignment process to improve timing in an IC design, according to some embodiments.

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

As noted above, placement is a key operation in the physical design cycle. During placement, exact locations are assigned to various components within an IC's core area. EDA applications often include placement engines that assign locations to circuit components while optimizing circuit characteristics according to design rules. A buffering engine takes a synthesized netlist together with a technology library and produces a placement layout.

Advanced IC designs can comprise multiple routing layers. Routing layers may be grouped into multiple buckets based on similarity in resistance and capacitance characteristics. For example, an IC design may comprise routing layers M1-M12, where M1-M6 are grouped into a bottom layer bucket, M7-M10 are grouped into a middle layer bucket, and M11 and M12 are grouped into to a top layer bucket. The bottom layer bucket provides the greatest amount of routing resources while having the largest wire resistance, and the top layer bucket has the least amount of routing resources while having the lowest wire resistance. In general, higher layers have a lower wire resistance and thus a smaller delay.

After placement, a design rule violation (DRV) stage is often performed to fix DRVs (e.g., a maximum capacitance violation, a maximum fanout violation, or a maximum transition violation) in a circuit design. Layer assignment is a common approach to fix design rule violations along with buffering. Layer assignment includes assigning a net to a layer bucket to limit routing of the net to layers within the assigned layer bucket. However, conventionally layer assignment is performed solely to satisfy maximum transition constraints. As a result, additional buffers or inverters need to be added to an IC design during the DRV fixing stage. Further, the middle and top layers are inefficiently used, if at all. What's more, buffers and nets in non-critical paths are never again revisited thereby leading to unnecessary area and power consumption of the design.

The conventional approach to layer assignment is to divide layer buckets into two categories: high-capacity route type (HCRT) and low-capacity route type (LCRT). HCRT usually contains bottom and middle layers, while LCRT contains high layers. With this conventional approach, layer assignment to middle and top layers are performed only to fix DRV violations as long as the congestion check passes. As a result, after DRV fixing, middle and top layers are rarely utilized.

A problem with the conventional approach is that some nets may not be timing critical after the DRV fixing step. As a result, in a subsequent process for global timing optimization, these non-timing critical nets are ignored, and optimizations are performed to improve timing in critical paths. More specifically, the buffers or inverters inserted in those non-timing critical paths during the DRV fixing stage are never revisited, which results in greater area and power consumption.

Aspects of the present disclosure address problems with the conventional approaches to electronic design automation (EDA), among others, with a IC design process that includes an improved layer assignment technique performed during DRV fixing and global timing optimization. The improved layer assignment technique is referred to as minimum area layer assignment. The minimum-area layer assignment mode encourages layer promotion if doing so results in a timing improvement. In other words, minimum-area layer assignment allows layer assignment on a net if certain timing improvements are satisfied.

When applied in an IC design process, the improved layer assignment technique helps to avoid adding extra buffers and invertors during DRV fixing for nets that are not in a critical timing path, thereby leaving more routing resources for timing critical nets during global optimization. This also leads to greater options for timing optimization of timing critical paths. In general, the improved layer assignment technique provides timing improvements during the DRV fixing stage, which offers a better timing starting point for later global timing optimization. For non-critical paths, the layer assignment technique saves chip area that may otherwise be occupied by buffers and invertors. Collectively, the application of the improved layer assignment technique, in both DRV fixing and global timing optimization, provides greater chip area and power utilization when compared to conventional approaches to EDA.

FIG. 1 is a diagram illustrating an example design process flow 100 that includes a minimum-area layer assignment process to improve timing in an IC design, according to some embodiments. As shown, the design process flow 100 includes a design phase 110, a device fabrication phase 120, a design verification phase 130, and a device verification phase 140. The design phase 110 involves an initial design input 112 operation where the basic elements and functionality of a device are determined, as well as revisions based on various analyses and optimization of a circuit design. This design input 112 operation is where block instances are used in the circuit design and any additional circuitry for the design around the blocks is selected. The initial strategy, tactics, and context for the device to be created are also generated in the design input 112 operation, depending on the particular design algorithm to be used.

In some embodiments, following an initial selection of design values in the design input 112 operation, routing, placement, and timing analysis are performed in a place and route 113 operation, and optimization is performed in an optimization 114 operation along with any other automated design processes. While the design process flow 100 shows place and route 113 and optimization 114 occurring prior to a layout instance 117, routing, placement, timing analysis, and optimization may be performed at any time to verify operation of a circuit design. For instance, in various embodiments, timing analysis in a circuit design may be performed prior to routing of connections in the circuit design, after routing, during register transfer level (RTL) operations, or as part of a signoff 118, as described below.

As shown, the optimization 114 operation includes a design rule violation (DRV) fixing 115 operation and a global timing optimization 116 operation. During the DRV fixing 115 operation, DRV are fixed using a variety of approaches including buffer insertion. During the global timing optimization 116 operation, timing characteristics of a circuit design are improved and enhanced using techniques such as buffer insertion. A minimum-area layer assignment process is applied during both the DRV fixing 115 operation and the global timing optimization 116 operation to improve timing. With minimum-area layer assignment, layer promotion is encouraged if it improves timing.

In conventional layer assignment, which is also referred to herein as minimum-layer assignment, layer promotion is minimized. In comparison, the minimum-area layer assignment process and the minimum-layer assignment are different in that during the minimum-layer assignment process, a net is assigned to a higher layer bucket only if maximum-transition constraints cannot be satisfied at lower layer buckets. For example, only if a long net is across placement blockage, thereby preventing buffer assertion, the minimum-area layer assignment process of assigns a net to high layer buckets in min-layer mode. However, in min-area mode, even if a long net does not cross placement blockage, the minimum-area layer assignment may assign the net to high layer bucket if there is a sufficient timing improvement. Additionally, the minimum-area layer assignment process uses a user-defined threshold to control how aggressively layer assignment is to be utilized. The user-defined threshold may, for example, comprise a timing improvement threshold that specifies an amount of timing improvement (e.g., a reduction in net delay) that needs to be achieved to promote a net to a higher layer. If promotion of a net to a higher layer does not result in a timing improvement that satisfies the timing improvement threshold, the net is not promoted to a higher layer. On the other hand, if layer promotion of a net results in a timing improvement that satisfies the timing improvement threshold, the net can be promoted to the higher level.

After design inputs are used in the design input 112 operation to generate a circuit layout, and any of the routing and optimization 114 operations are performed, a layout is generated in the layout instance 117. The layout describes the physical layout dimensions of the device that match the design inputs. Prior to this layout being provided to a fabrication 122 operation, the signoff 118 is performed on the circuit design defined by the layout.

After signoff verification by the signoff 118, a verified version of the layout is used in the fabrication 122 operation to generate a device, or additional testing and design updates may be performed using designer inputs or automated updates based on design simulation 132 operations or extraction, 3D modeling, and analysis 144 operations. Once the device is generated, the device can be tested as part of device test 142 operations, and layout modifications generated based on actual device performance.

A design update 136 from the design simulation 132; a design update 146 from the device test 142 or the extraction, 3D modeling, and analysis 144 operations; or the design input 112 operation may occur after the initial layout instance 117 is generated. In various embodiments, whenever design inputs are used to update or change an aspect of a circuit design, a timing analysis and the routing and optimization 114 operation may be performed.

Figure 2:
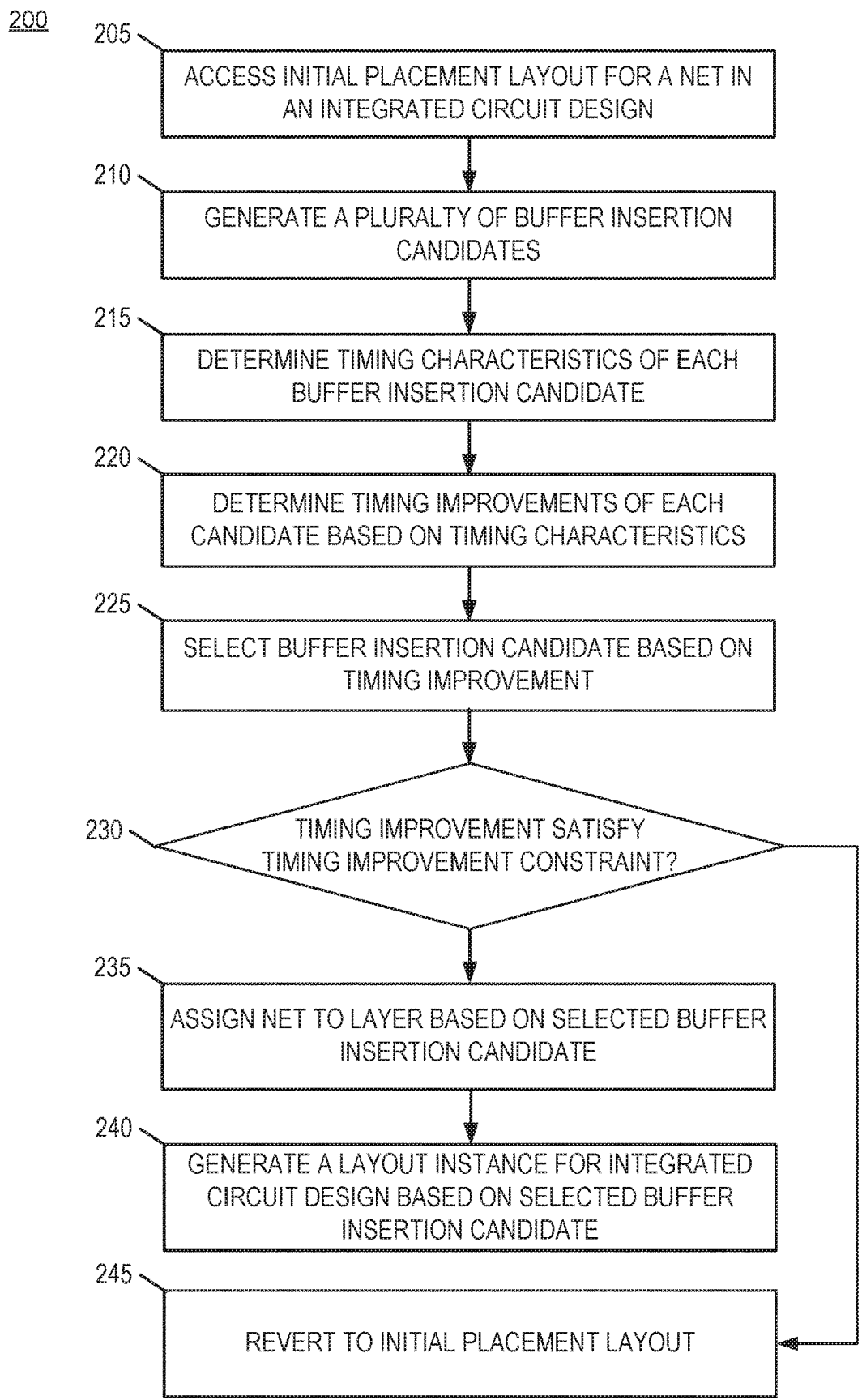
FIG. 2 is a flowchart illustrating operations of a method for minimum-area layer assignment to improve timing in an IC design according to some embodiments.

FIG. 2 is a flowchart illustrating operations of a method 200 for minimum-area layer assignment in an IC design process to improve device timing, according to some example embodiments. For some embodiments, the method 200 is performed as part of a place and route process applied to a circuit design (e.g., by an EDA system). More specifically, the method 200 can be performed as part of both a DRV fixing stage and a global optimization stage.

It will be understood that the method 200 may be performed by a computing device, such as a computing device executing instructions of an EDA system. For example, the operations of the method 200 may be represented by executable instructions (e.g., EDA software) that, when executed by a processor of a computing device, cause the computing device to perform the method 200. Thus, an operation of the method 200 may be performed by a hardware processor (e.g., central processing unit or graphics processing unit) of a computing device (e.g., desktop, server, etc.). Accordingly, the method 200 is described below in reference to such a computing device.

Depending on the embodiment, an operation of the method 200 may be repeated in different ways or involve intervening operations not shown. Though the operations of the method 200 may be depicted and described in a certain order, the order in which the operations are performed may vary among embodiments, including performing certain operations in parallel.

The method 200 as illustrated begins at operation 205 where the computing device accesses an initial placement layout of a net of an integrated circuit (IC) design from memory. The initial placement layout is generated during a placement process of design process flow 100. The initial placement layout specifies locations of circuit components of the net within the IC design. The computing device may access the initial placement layout from a database of an EDA system. The IC design comprises multiple layers that are grouped together into buckets. For example, the IC design may comprise a top layer bucket, a middle layer bucket, and a bottom layer bucket. Each layer bucket may comprise one or more layers of the design.

At operation 210, the computing device generates a plurality of buffer insertion candidates for the net of the IC design using combinations of multiple buffer types, multiple buffer insertion points, and multiple layer assignments. In generating the plurality of buffer insertion candidates, the computing device identifies multiple candidate buffer insertion points in the initial placement layout and the computing device determines buffer insertion candidates for each possible buffer type at each candidate buffer insertion point using multiple layer assignments. That is, the computing device generates a buffer insertion candidate for each layer bucket at each candidate buffer insertion point using each buffer type.

As an example, the computing device may generate a first buffer insertion candidate by inserting a first buffer type at a first buffer insertion point and assigning the net to a first layer bucket. Following this example, the computing device may generate a second buffer insertion candidate by inserting the first buffer type at the first buffer insertion point and assigning the net to a second layer bucket. Furthering this example, the computing device may generate a third buffer insertion candidate by inserting a second buffer type at the first buffer insertion point and assigning the net to the first layer bucket.

The computing device, at operation 215, determines timing characteristics of each buffer insertion candidate. In determining the timing characteristics, the computing device determines a net delay in a timing path of each buffer insertion candidate. The net delay comprises a wire delay and a driver cell delay.

The computing device determines timing improvements of each buffer insertion candidate (operation 220) based on respective timing characteristics of each buffer insertion candidate. More specifically, the computing device determines the timing improvement of a particular buffer insertion candidate based on a comparison of the timing characteristics associated with the buffer insertion candidate with timing characteristics of the initial placement layout. The timing improvement of the buffer insertion candidate corresponds to a difference between the timing characteristics.

For example, the computing device may determine a timing improvement of a buffer insertion candidate based on the difference between a net delay associated with buffer insertion candidate and a net delay associated with the initial placement layout. In other words, the timing improvement of a particular buffer insertion candidate may comprise a reduction to the net delay represented by the buffer insertion candidate (e.g., a reduction to the net delay caused by assigning the net to a higher layer).

At operation 225, the computing device selects a buffer insertion candidate based on the timing improvements of each placement candidate. In some embodiments, the computing device may select the buffer insertion candidate that provides the greatest timing improvement while satisfying various design constraints such as maximum transition, capacitance, fan-out limit, and routing congestion. For example, the computing device may select the buffer insertion candidate that provides the greatest net time delay reduction for the net while satisfying various design constraints such as maximum transition, capacitance, fan-out limit, and routing congestion. Accordingly, the selection of a buffer insertion candidate also comprises verifying that the buffer insertion candidate satisfies design constraints.

In some embodiments, the computing device may utilize a cost function in the selection of the buffer insertion candidate. The cost function may be used to determine a cost for each buffer insertion candidate based in part on the determined timing improvements. Weights in the cost function are established such that candidates with higher timing improvements are weighted higher while also preferring layer assignment on higher layers so as to minimize routing congestion. In these embodiments, the computing device selects a buffer insertion candidate based on costs determined by the cost function.

At operation 230, the computing device determines whether the timing improvement satisfies a timing improvement constraint. The timing improvement constraint may comprise a timing improvement target. The timing improvement constraint may be a user input (e.g., a user-specified timing improvement target). For example, a user may specify a particular timing improvement target to be provided by the layer assignment process. The timing improvement target may comprise a net delay reduction target (e.g., 25 ps). If the timing improvement of the buffer insertion candidate does not satisfy the timing improvement constraint, the computing device may select a new buffer insertion candidate to assess in view of the timing improvement constraint, or the computing device may revert to the initial placement layout without relying upon further layer assignments to provide timing improvements.

Based on determining that the timing improvement of the selected buffer insertion candidate satisfies the timing improvement constraint, the computing device, at operation 235, assigns the net of the IC design to a layer bucket based on the selected buffer insertion candidate.

At operation 240, the computing device generates a design layout instance for the IC device design based in part on the selected buffer insertion candidate. The layout describes the physical layout dimensions of the IC device. In generating the design layout instance, the computing device performs one or more routing processes to interconnect components of the net at locations specified by the selected buffer insertion candidate.

If, at operation 230, the computing device determines that the timing improvement does not satisfy the timing improvement constraint (e.g., the timing improvement is below the timing improvement threshold), the computing device reverts to the initial placement layout, at operation 245.

Figure 3A:
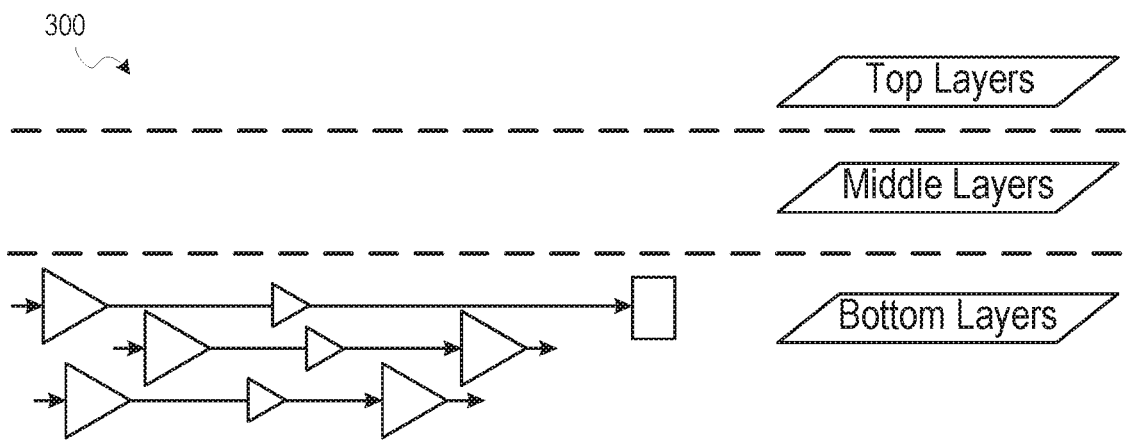
FIGS. 3A-3C are conceptual diagrams that illustrate an example application of a minimum-area layer assignment in an IC design process to improve device timing, according to some example embodiments.
Figure 3B:
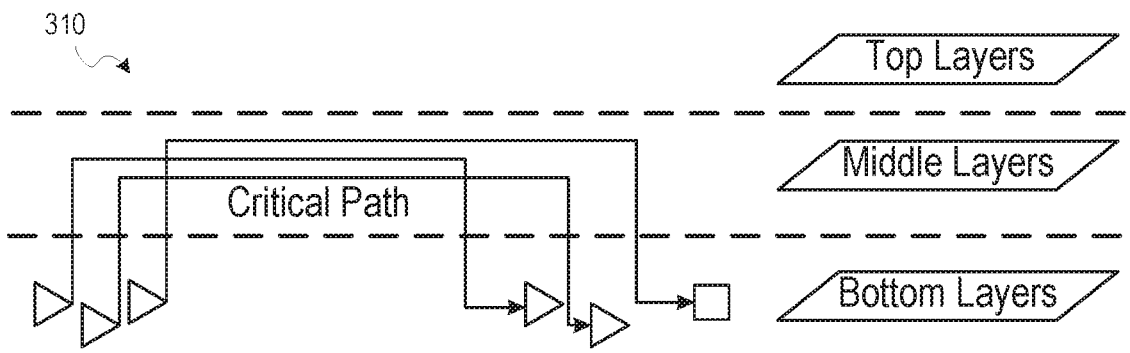
Figure 3C:
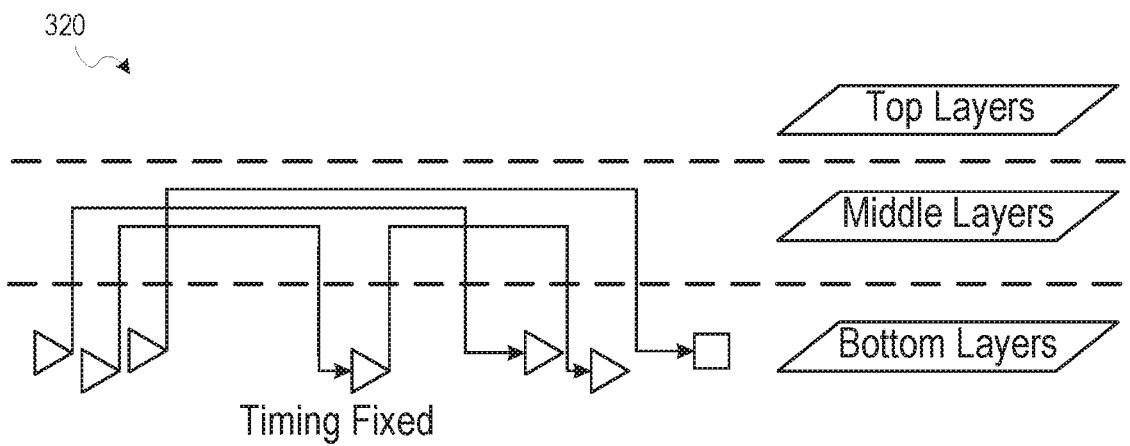

FIGS. 3A-3C are conceptual diagrams that illustrate an example application of layer assignment in an IC design process to improve device timing, according to some example embodiments. With reference to FIG. 3A, an initial placement layout 300 of an IC design is shown. The IC design includes multiple routing layers—top layers, middle layers, and bottoms layers. As shown, the initial placement layout 300 includes three nets placed at in the bottom during placement.

With reference to FIG. 3B, a modified placement layout 310 is shown. The modified placement layout 310 is produced as a result of a DRV fixing 115 operation in which the minimum-area layer assignment techniques described herein are applied. As shown, in the modified placement layout 310, middle layers are fully utilized as a result of layer assignments applied to the three nets. The three nets are assigned to the higher layers based on the assignment providing a timing improvement that at least meets a threshold timing improvement. Further, as shown, a critical path is identified in which a design constraint violation is detected based on the timing of the net.

With reference to FIG. 3C, a further modified placement layout 320 is shown. Modified placement layout 320 is produced as a result of a global timing optimization 116 operation in which the minimum-area layer assignment techniques described herein are applied. As shown, layers are fully utilized while the timing of the critical path is fixed through insertion of a single buffer, thereby fixing the design constraint violation. Application of the minimum-area layer assignment in both the DRV fixing 115 and global timing optimization 116 operations results in fewer buffers being inserted into the three nets because higher routing layers are utilized to improve overall timing.

Figure 4:
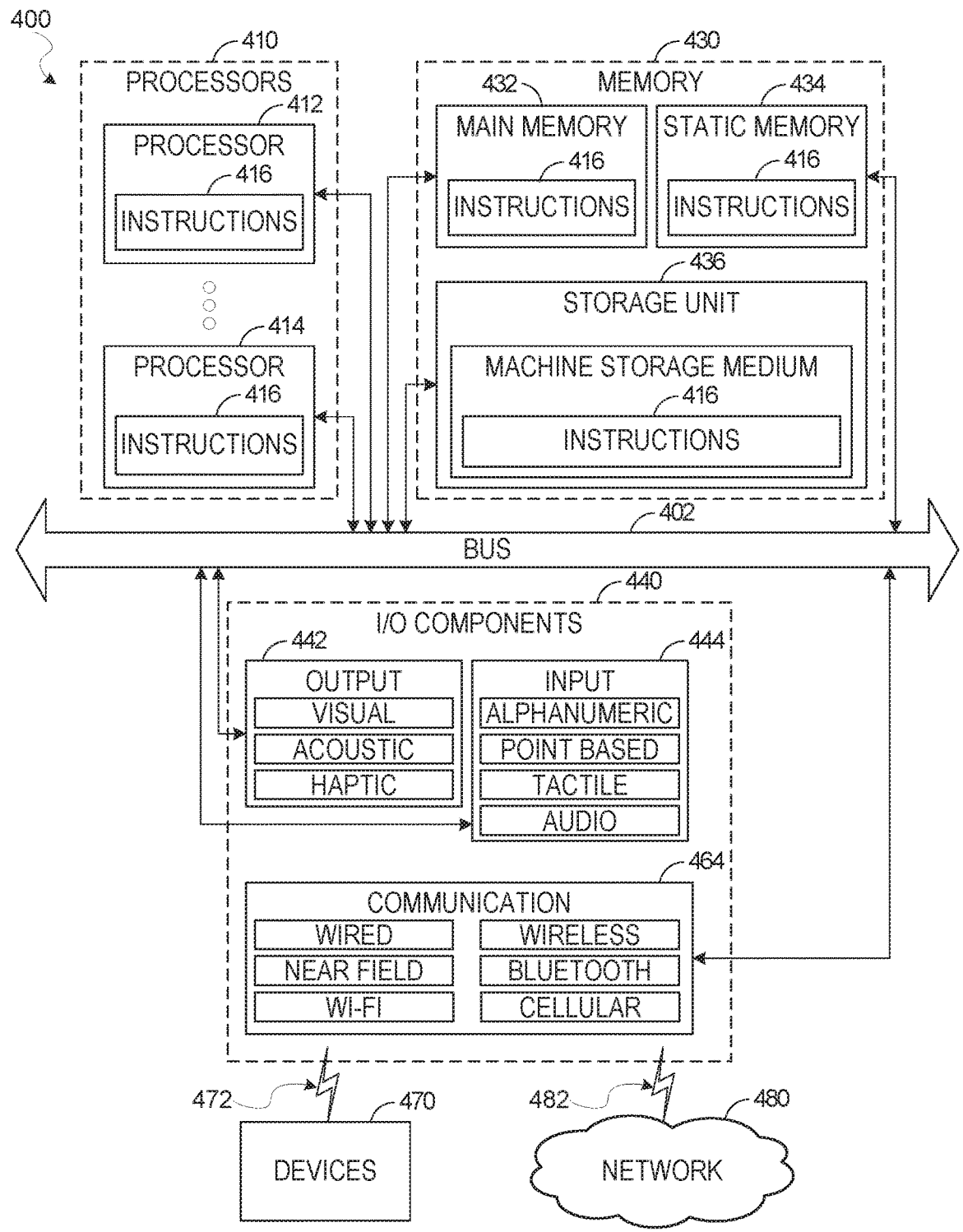
FIG. 4 is a diagrammatic representation of a machine in the example form of a computer system within which a set of instructions for causing the machine to perform any one or more of the methodologies discussed herein may be stored and executed.

FIG. 4 illustrates a diagrammatic representation of a machine 400 in the form of a computer system within which a set of instructions may be executed for causing the machine 400 to perform any one or more of the methodologies discussed herein, according to an example embodiment. Specifically, FIG. 4 shows a diagrammatic representation of the machine 400 in the example form of a computer system, within which instructions 416 (e.g., software, a program, an application, an applet, an app, or other executable code) for causing the machine 400 to perform any one or more of the methodologies discussed herein may be executed. For example, the instructions 416 may transform the machine 400 into an EDA system that executes the method 200. Additionally, or alternatively, the instructions 416 may implement FIGS. 1 and 3A-3C. The instructions 416 transform the general, non-programmed machine 400 into a particular machine 400, such as an EDA system, programmed to carry out the described and illustrated functions in the manner described here. In alternative embodiments, the machine 400 operates as a standalone device or may be coupled (e.g., networked) to other machines. In a networked deployment, the machine 400 may operate in the capacity of a server machine or a client machine in a server-client network environment, or as a peer machine in a peer-to-peer (or distributed) network environment. The machine 400 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 416, sequentially or otherwise, that specify actions to be taken by the machine 400. Further, while only a single machine 400 is illustrated, the term "machine" shall also be taken to include a collection of machines 400 that individually or jointly execute the instructions 416 to perform any one or more of the methodologies discussed herein.

The machine 400 may include processors 410, memory 430, and I/O components 440, which may be configured to communicate with each other such as via a bus 402. In an example embodiment, the processors 410 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 412 and a processor 414 that may execute the instructions 416. The term "processor" is intended to include multi-core processors 410 that may comprise two or more independent processors (sometimes referred to as "cores") that may execute instructions contemporaneously. Although FIG. 4 shows multiple processors 410, the machine 400 may include a single processor with a single core, a single processor with multiple cores (e.g., a multi-core processor), multiple processors with a single core, multiple processors with multiple cores, or any combination thereof.

The memory 430 may include a main memory 432, a static memory 434, and a storage unit 436, both accessible to the processors 410 such as via the bus 402. The main memory 432, the static memory 434, and the storage unit 436 store the instructions 416 embodying any one or more of the methodologies or functions described herein. The instructions 416 may also reside, completely or partially, within the main memory 432, within the static memory 434, within the storage unit 436, within at least one of the processors 410 (e.g., within the processor's cache memory), or any suitable combination thereof, during execution thereof by the machine 400.

The I/O components 440 may include a wide variety of components to receive input, provide output, produce output, transmit information, exchange information, capture measurements, and so on. The specific I/O components 440 that are included in a particular machine will depend on the type of machine. For example, portable machines such as mobile phones will likely include a touch input device or other such input mechanisms, while a headless server machine will likely not include such a touch input device. It will be appreciated that the I/O components 440 may include many other components that are not shown in FIG. 4. The I/O components 440 are grouped according to functionality merely for simplifying the following discussion and the grouping is in no way limiting. In various example embodiments, the I/O components 440 may include output components 442 and input components 444. The output components 442 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 444 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 440 may include communication components 464 operable to couple the machine 400 to a network 480 or devices 470 via a coupling 482 and a coupling 472, respectively. For example, the communication components 464 may include a network interface component or another suitable device to interface with the network 480. In further examples, the communication components 464 may include wired communication components, wireless communication components, cellular communication components, and other communication components to provide communication via other modalities. The devices 470 may be another machine or any of a wide variety of peripheral devices (e.g., a peripheral device coupled via a universal serial bus (USB)).

Executable Instructions and Machine Storage Medium

The various memories (e.g., 430, 432, 434, and/or memory of the processor(s) 410) and/or the storage unit 436 may store one or more sets of instructions and data structures (e.g., software) embodying or utilized by any one or more of the methodologies or functions described herein. These instructions (e.g., instructions 416), when executed by the processor(s) 410, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 480 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 480 or a portion of the network 480 may include a wireless or cellular network, and the coupling 482 may be a Code Division Multiple Access (CDMA) connection, a Global System for Mobile communications (GSM) connection, or another type of cellular or wireless coupling. In this example, the coupling 482 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 416 may be transmitted or received over the network 480 using a transmission medium via a network interface device (e.g., a network interface component included in the communication components 464) and utilizing any one of a number of well-known transfer protocols (e.g., hypertext transfer protocol (HTTP)). Similarly, the instructions 416 may be transmitted or received using a transmission medium via the coupling 472 (e.g., a peer-to-peer coupling) to the devices 470. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 416 for execution by the machine 400, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of a method may be performed by one or more processors. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A electronic design automation (EDA) system comprising:
   one or more processors of a machine; and
   a computer-storage medium storing instructions, which when executed by the machine, cause the machine to perform operations comprising:
   accessing, from memory, an initial placement layout of a net of an integrated circuit (IC) design, the IC design comprising multiple layers;
   identifying multiple candidate insertion points in the initial placement layout of the net, the multiple candidate insertion points including candidate insertion points in each layer of the multiple layers;
   generating a plurality of buffer insertion candidates using the multiple candidate buffer insertion points, multiple buffer types, and multiple layer assignments from among multiple layers of the IC design, the generating of the plurality of buffer insertion candidates including generating buffer insertion candidates for each layer assignment by inserting each buffer type of the multiple buffer types at each candidate buffer insertion point;
   determining timing characteristics of each buffer insertion candidate;
   determining a timing improvement provided by each buffer insertion candidate based on respective timing characteristics;
   selecting a buffer insertion candidate from the plurality of buffer insertion candidates based on the timing improvement provided by the buffer insertion candidate; and
   generating a layout instance for the IC design based in part on the selected buffer insertion candidate.

2. The EDA system of claim 1, wherein the selecting of the buffer insertion candidate comprises:
   determining that the timing improvement provided by the buffer insertion candidate satisfies a timing improvement constraint.

3. The EDA system of claim 2, wherein the timing improvement constraint is based on user input.

4. The EDA system of claim 2, wherein the timing improvement constraint comprises a net delay reduction target.

5. The EDA system of claim 1, wherein determining the timing improvement of each layer assignment comprises determining a timing improvement provided by the buffer insertion candidate by comparing timing characteristics of the buffer insertion candidate with timing characteristics of the initial placement layout.

6. The EDA system of claim 5, wherein:
   the timing characteristics of the buffer insertion candidate comprise a net delay associated with the buffer insertion candidate; and
   comparing the timing characteristics of the buffer insertion candidate with the timing characteristics of the initial placement layout comprises determining a net delay reduction provided by the buffer insertion candidate.

7. The EDA system of claim 1, wherein the operations further comprise:
   assigning the net to a layer in the IC design based on the selected buffer insertion candidate.

8. The EDA system of claim 1, wherein the generating of the plurality of buffer insertion candidates comprises generating a plurality of combinations of the multiple candidate buffer insertion points with the multiple layer assignments.

9. A method for electronic design automation, the method comprising:
   accessing, from a memory, an initial placement layout of a net of an integrated circuit (IC) design, the IC design comprising multiple layers;
   identifying multiple candidate insertion points in the initial placement layout of the net, the multiple candidate insertion points including candidate insertion points in each layer of the multiple layers;
   generating, using one or more processors of a machine, a plurality of buffer insertion candidates using the multiple candidate buffer insertion points, multiple buffer types, and multiple layer assignments from among multiple layers of the IC design, the generating of the plurality of buffer insertion candidates including generating buffer insertion candidates for each layer assignment by inserting each buffer type of the multiple buffer types at each candidate buffer insertion point;
   determining timing characteristics of each buffer insertion candidate in the plurality of buffer insertion candidates;
   determining a timing improvement provided by each buffer insertion candidate based on respective timing characteristics;

selecting a buffer insertion candidate from the plurality of buffer insertion candidates based on the timing improvement provided by the buffer insertion candidate; and assigning the net to a layer in the IC design based on the selected buffer insertion candidate.

10. The method of claim 9, wherein the selecting of the buffer insertion candidate comprises:

determining that the timing improvement provided by the buffer insertion candidate satisfies a timing improvement constraint.

11. The method of claim 10, wherein the timing improvement constraint comprises a user-specified timing improvement target.

12. The method of claim 11, wherein the timing improvement constraint comprises a net delay reduction target.

13. The method of claim 9, wherein determining the timing improvement of each buffer insertion candidate comprises determining a timing improvement provided by the buffer insertion candidate by comparing timing characteristics of the buffer insertion candidate with timing characteristics of the initial placement layout.

14. The method of claim 9, wherein:

the timing characteristics of the buffer insertion candidate comprise a net delay associated with the buffer insertion candidate; and comparing the timing characteristics of the buffer insertion candidate with the timing characteristics of the initial placement layout comprises determining a net delay reduction provided by the buffer insertion candidate.

15. The method of claim 9, wherein the generating of the plurality of buffer insertion candidates comprises generating a plurality of combinations of the multiple candidate buffer insertion points with the multiple layer assignments.

16. The method of claim 9, further comprising:

generating a layout instance for the IC design based in part on the selected buffer insertion candidate.

17. A computer-storage medium storing instructions, which when executed by a machine, cause the machine to perform operations comprising:

accessing, from a memory, an initial placement layout of a net of an integrated circuit (IC) design, the IC design comprising multiple layers;

identifying multiple candidate insertion points in the initial placement layout of the net, the multiple candidate insertion points including candidate insertion points in each layer of the multiple layers;

generating, using one or more processors of a machine, a plurality of buffer insertion candidates using multiple candidate buffer insertion points, multiple buffer types, and multiple layer assignments from among multiple layers of the IC design, the generating of the plurality of buffer insertion candidates including generating buffer insertion candidates for each layer assignment by inserting each buffer type of the multiple buffer types at each candidate buffer insertion point;

determining a net delay associated with a buffer insertion candidate;

determining a timing improvement of the buffer insertion candidate based on the net delay associated with the buffer insertion candidate;

selecting the buffer insertion candidate from the plurality of buffer insertion candidates based on the timing improvement provided by the buffer insertion candidate; and assigning the net to a layer in the design based on the selected buffer insertion candidate.

18. The computer-storage medium of claim 17, wherein the selecting of the buffer insertion candidate comprises:

determining that the timing improvement provided by the buffer insertion candidate satisfies a timing improvement constraint.

19. The computer-storage medium of claim 18, wherein the timing improvement constraint comprises a net delay reduction target specified by a user.

20. The computer-storage medium of claim 17, wherein the determining of the timing improvement provided by the buffer insertion candidate comprises comparing the net delay of the buffer insertion candidate with a net delay associated with the initial placement layout.

* * * * *